Yates & Dezzell.
Beer Cooler.
N° 84,244. Patented Nov. 17, 1868.

WITNESSES:

INVENTOR:

United States Patent Office.

JOHN YATES AND EDGAR DEUELL, OF BROOKLYN, NEW YORK.

Letters Patent No. 84,244, dated November 17, 1868.

IMPROVED BEER-COOLER.

The Schedule referred to in these Letters Patent and making part of the same.

*To all whom it may concern:*

Be it known that we, JOHN YATES and EDGAR DEUELL, of the city of Brooklyn, in the county of Kings, and State of New York, have invented a new and improved Apparatus or Device for Cooling Beer and other liquids; and that the following description, taken in connection with the accompanying drawings, hereinafter referred to, forms a full and exact specification of the same, wherein we have set forth the nature and principles of our said improvement, by which our invention may be distinguished from all others of a similar class, together with such parts as we claim, and desire to have secured to us by Letters Patent.

This invention relates to a new and improved apparatus or device for cooling beer and other liquids. The invention refers to an improvement in that class of coolers in which cold water is made to pass through a series of pipes, and the warm liquid to be cooled made to pass over said pipes.

The invention consists in an improved means by which the ends of the pipes are connected or made to communicate one with another; and, also, to a means for enclosing the series of pipes by which the beer or other liquid, in passing down over the cool-water pipes, is protected from the external air.

The object of the invention is to obviate the difficulties which now present themselves in the cooling of beer and other liquids, by these means:

First, the leaking of the connections or joints of the pipes, a result due to the expansion and contraction of the pipes under the extremes of temperature to which they are subjected; and, Second, the deterioration of the liquid while being cooled, especially beer, by exposure to the atmosphere.

In the accompanying sheet of drawings—

Figure 1:
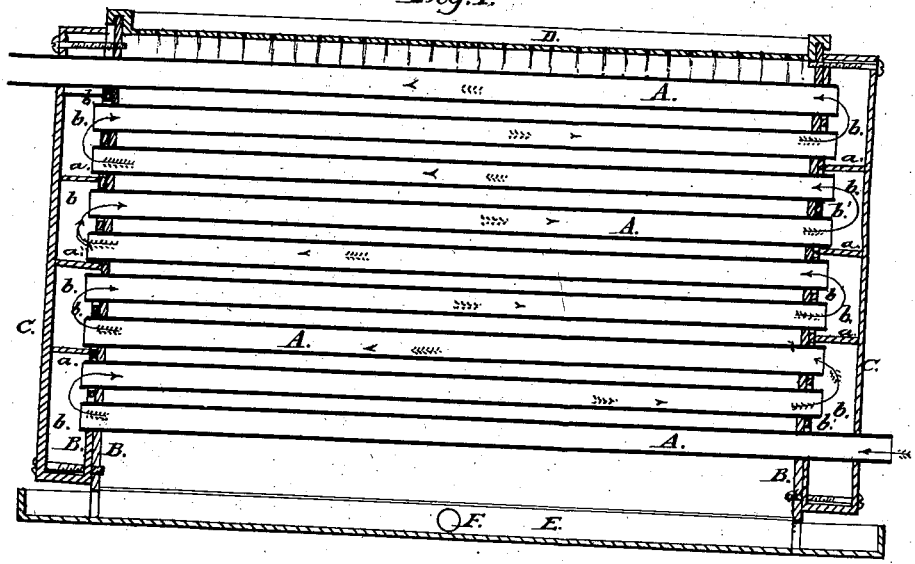
Figure 2:
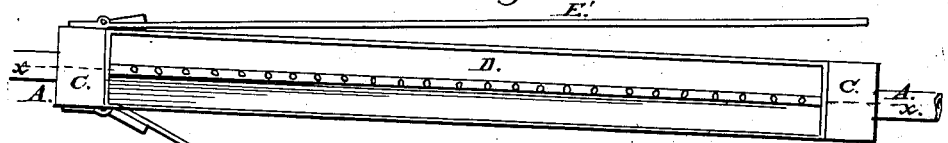

Figure 1 represents a vertical central section of our invention, taken in the line *x x*, fig. 2.

Figure 2, a plan or top view of the same.

Similar letters of reference indicate corresponding parts in the several drawings.

A represents a series of pipes or tubes, which are placed one above the other, and have their ends fitted in plates, B B, and secured therein by set-screws or other means, which will admit of the pipes or tubes being readily detached, when necessary.

The pipes or tubes A project through the plates B B, and extend into boxes, C C, which are secured by screws, or otherwise, to the outer sides of the plates B B.

These boxes are divided by partitions, *a*, into compartments, *b*, into each of which the ends of the pipes or tubes A pass, as shown clearly in fig. 1.

The ends of the pipes or tubes, where they pass through into the boxes C C, are provided with packing, *b'*, in order to prevent leakage.

By means of these boxes, divided into compartments, and the ends of the pipes or tubes fitting into them, as shown, it will be seen that a communication is formed between the ends of the pipes or tubes, and all danger of breakage, by means of the expansion and contraction of metal, avoided; and, in case the pipes or tubes require cleaning, the boxes C may be detached, and also the pipes or tubes, and the latter thoroughly cleansed, and replaced without any trouble or difficulty whatever.

The beer, or other liquid to be cooled, is allowed to descend into a trough, D, placed directly over the uppermost pipe or tube A, said trough having a perforated bottom, through which the warm beer or other liquid is allowed to pass, and descend over the pipes or tubes A, the latter having a current of cold water passing through them, from the bottom one upward, as indicated by the arrows. The beer or other warm liquid, in passing down over these cool-water pipes, is cooled, the beer or other liquid dropping into a receiver, E, underneath the lowest pipe or tube A, from which it is discharged, through a pipe, F, into a proper vat or receptacle designed to receive it.

In the cooling of many liquids, especially beer, it is essential that provision be made against exposure to the external air, and to this end we enclose the pipes or tubes A by doors, E' E', one end of which is hinged to one of the boxes C. These doors, when closed, admit of the liquid to be cooled passing down over the exterior surface of the pipe or tubes A without being exposed to the external air, and, at the same time, do not in the least prevent free access to the pipes or tubes whenever required.

The ordinary coolers, of the class herein described, have the ends of their water-pipes connected by elbows or V-joints, and these are very difficult to keep watertight, owing to the expansion and contraction of the pipes under the variable temperature to which they are subjected, the warm beer in the one case passing down over the exterior surfaces of the pipes or tubes, and the cold water in the other case passing up through the pipes or tubes A. Our improvement effectually obviates this difficulty, as the pipes or tubes may expand and contract, and their ends, at the same time, fit tightly in the boxes C C, and, as the pipes or tubes are rendered very accessible, they may be cleansed whenever required, without any trouble or difficulty whatever.

We do not claim, broadly, the cooling of beer and other liquids, by allowing the same to pass through a perforated trough over a series of pipes or tubes, through which a current of cold water is made to flow, for this is an old and well-known device, and in general use, especially in breweries; but We do claim as new, and desire to secure by Letters Patent—

1. Connecting the ends of the pipes or tubes A by means of boxes, C, divided into compartments by means of partitions *a*, the ends of the pipes or tubes passing through, suitable standards or plates, B, into the compartments of said boxes, substantially as shown and described.

2. Enclosing the series of pipes or tubes A by means of doors, E' E', hinged to one of the boxes C, substantially as and for the purpose herein set forth.

JOHN YATES.
EDGAR DEUELL.

Witnesses:
LOUIS R. KIRCHEIS,
H. L. WATTENBERG.